United States Patent
Koo

(10) Patent No.: US 7,280,525 B2
(45) Date of Patent: Oct. 9, 2007

(54) WIRELESS COMMUNICATION DEVICE AND METHOD FOR SELECTING A MULTI-BAND

(75) Inventor: In-Hoe Koo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 703 days.

(21) Appl. No.: 10/738,373

(22) Filed: Dec. 17, 2003

(65) Prior Publication Data

US 2004/0228321 A1    Nov. 18, 2004

(30) Foreign Application Priority Data

Dec. 17, 2002 (KR) .................. 10-2002-0080666

(51) Int. Cl.
*H04J 3/06* (2006.01)
(52) U.S. Cl. ................ 370/350; 370/503; 455/403; 455/63.3
(58) Field of Classification Search ........ 455/403, 455/436–439, 168.1, 63.3, 71; 370/350, 370/503
See application file for complete search history.

(56) References Cited

U.S. PATENT DOCUMENTS

| | | | |
|---|---|---|---|
| 6,311,064 B1 * | 10/2001 | Bamburak et al. | 455/434 |
| 6,393,279 B1 * | 5/2002 | Lee | 455/426.1 |
| 2003/0152046 A1 * | 8/2003 | Kawai | 370/328 |
| 2005/0048932 A1 * | 3/2005 | Balasubramaniyan et al. | 455/93 |

* cited by examiner

*Primary Examiner*—CongVan Tran
(74) *Attorney, Agent, or Firm*—The Farrell Law Firm. P.C.

(57) ABSTRACT

A wireless communication device for adaptively selecting a multi-band that is an operational frequency band in accordance with a received frequency. The device includes a storage section for storing the frequency bands set for performing the wireless communication and variable values for the respective frequency bands, and storing the frequency band used for a normal service operation, a power supply section for supplying a power for performing the normal service in accordance with an input command, a comparison section for determining whether a received frequency is synchronized with spaced frequencies set in the frequency band which is used for the normal service operation and stored in the storage section if the power is supplied, a determining section for determining whether the synchronized frequency is included in the frequency band used for the normal service operation if the received frequency is at least once synchronized with the spaced frequencies, and a control section for selecting the frequency band used for the normal service operation as the operational frequency band, if the synchronized frequency is included in the frequency band used for the normal service operation.

11 Claims, 4 Drawing Sheets

| NUMBER | 4 BITS (N) | | FREQUENCY BAND | NUMBER OF BANDS |
|---|---|---|---|---|
| | 3 BITS | 1 BIT | | |
| 1 | 000 | 0 | GSM | SINGLE BAND |
| 2 | 001 | | DCS | |
| 3 | 010 | | PCS | |
| 4 | 011 | 1 | GSM AND DCS | MULTI-BAND |
| 5 | 100 | | GSM AND PCS | |
| 6 | 101 | | WHOLE BAND | |
| 7~8 | 110~111 | 1 | RESERVED BAND | |

FIG.2

WIRELESS COMMUNICATION DEVICE AND METHOD FOR SELECTING A MULTI-BAND

PRIORITY

This application claims priority to an application entitled "Wireless Communication Device and Method for Selecting Multi-band Using the Device" filed in the Korean Industrial Property Office on Dec. 17, 2002 and assigned Serial No. 2002-80666, the contents of which are hereby incorporated by reference.

BACKGROUND OF THE INVENTION

1. Field of the Invention

The present invention relates generally to a wireless communication device and method for selecting a multi-band, and more particularly to a wireless communication device and method for selecting a multi-band by selecting an operable frequency band in accordance with an externally received frequency, and performing a communication with an external device according to the selected frequency band.

2. Description of the Related Art

Recently, wireless communication devices capable of performing a wireless communication using different communication systems or different frequency bands have been developed. Such wireless communication devices perform wireless communication by selecting an operable frequency band with respect to the different communication systems or frequency bands.

Wireless communication systems are conventionally divided into a global system for a mobile communication (GSM), a digital cellular system (DCS), and a personal communication system (PCS). A GSM and a DCS are used in Europe, and a PCS is used in The United States. The allocated frequency band for the wireless communication using GMS is in the range of 880 MHz to 960 MHz, and the allocated frequency band for the wireless communication using DCS is in the range of 1,710 MHZ to 1,880 MHz. The allocated frequency band for the wireless communication using PCS is in the range of 1,850 MHz to 1,990 MHz.

In a wireless communication device in which a variable band selection is possible with respect to a plurality of frequency bands receives frequencies set for a cell corresponding to its location, and compares the received frequencies with frequencies within the frequency band selected among the frequency bands of GSM, DCS, and PCS in order to synchronize with the received frequencies. In this case, if there is a frequency that belongs to the selected frequency band among the received frequencies, the wireless communication device selects the frequency band as its operational frequency band.

Selection of an operational frequency band using the conventional wireless communication device can be classified into three methods. First is a single band selection method for selecting one frequency band among the frequency bands of GSM, DCS, and PCS, and using the selected frequency band for the wireless communication. Second is a dual band selection method for selecting only two frequency bands among the frequency bands of GSM, DCS, and PCS, and using the two selected frequency bands for the wireless communication. Last is a manual band selection method for selecting the frequency band among the frequency bands of GMS, DCS, and PCS by a user's manipulation, and using the selected frequency band for the wireless communication.

The method for selecting an operational frequency band using the conventional wireless communication device will be described herein below. In explanation, it is exemplified that the wireless communication device is of an American type.

The conventional single band selection method has an advantage in that because it uses only a frequency band allocated to PCS for its operational frequency band, the time required for searching for a proper cell and entering into a normal service in an initial power-on state or a no-service state is shortened. However, the conventional single band selection method has a disadvantage that in Europe where frequency bands different from the United States, the service using the wireless communication device as described above cannot be provided.

The conventional dual band selection method has an advantage that the service can be provided in the United States and also in Europe. However, the conventional dual band selection method has a disadvantage that if there are many frequencies included in the frequency band allocated to GSM among the received frequencies, a synchronization error is frequently produced, and the time for entering into a normal service is delayed.

Finally, the conventional manual band selection method has an advantage that because the frequency band is selected by the user to be suitable for the present channel state, the problems produced in the single band selection method and the dual band selection method can be somewhat solved. However, the conventional manual band selection method has the disadvantage in that if the wireless communication device is located on a boundary between an area where the United State type frequency band is used and an area where the European type frequency band is used, the user must frequently manipulate the frequency bands allocated to the areas for a smooth reception of the service. Also, when using the manual band selection method, the user must be well acquainted with a provided manual for the frequency band selection.

SUMMARY OF THE INVENTION

Accordingly, the present invention has been designed to solve the above and other problems occurring in the prior art, and an object of the present invention is to provide a wireless communication device and method for selecting an operational frequency band by adaptively selecting an operational frequency band for a normal service in accordance with a wireless channel state of the frequency of the service being provided.

It is another object of the present invention to provide a wireless communication device and method for selecting an operational frequency band by reducing a time required for entering into a normal service when the device moves through different frequency bands in areas where communication is performed using different frequency bands.

It is still another object of the present invention to provide a wireless communication device and a method for selecting an operational frequency band by selecting an easily received frequency band as an optimum operational frequency band without having to be well acquainted with a provided manual.

In order to accomplish the above and objects, there is provided a wireless communication device for performing a wireless communication through set operational frequency bands, comprising: a storage section for storing the frequency bands set for performing the wireless communication, variable values for the respective frequency bands, and the set frequency band used for a normal service operation among the frequency bands and variable values corresponding to the frequency band; a power supply section for supplying a power for performing the normal service in accordance with an input command; a comparison section for determining whether a received frequency is synchronized with spaced frequencies set in the frequency band which is used for the normal service operation and stored in the storage section if the power is supplied, a determining section for determining whether the synchronized frequency is included in the frequency band used for the normal service operation, if the received frequency is synchronized at least once with the spaced frequencies; and a control section for selecting the frequency band used for the normal service operation as the operational frequency band, if the synchronized frequency is included in the frequency band used for the normal service operation.

Preferably, the comparison section, if the received frequency is not synchronized with any of the spaced frequencies at all, compares whether the received frequency is synchronized with spaced frequencies set in frequency bands except for the frequency band used for the normal service operation. Also, the frequency bands stored in the storage section include a frequency band allocated to PCS and a frequency band including GSM and DCS.

If the determining section determines that the synchronized frequency is not included in the frequency band used for the normal service operation, the control section determines whether the synchronized frequency is in an overlapping band of different kinds of frequency bands used in different areas, and if it is determined that the synchronized frequency is in the overlapping band, the control section selects a whole band as an operational frequency band. Also, the variable value corresponding to the frequency band stored in the storage section is composed of 4 bits.

In another aspect of the present invention, there is provided a method for selecting an operational frequency band using a wireless communication device, comprising the steps of: storing frequency bands set for performing the wireless communication, variable values for the respective frequency bands, and a frequency band used for a normal service operation among the frequency bands and variable values corresponding to the frequency band; supplying a power for performing the normal service in accordance with an input command; determining whether a received frequency is synchronized with spaced frequencies set in the frequency band which is used for the normal service operation and stored in the storage section if the power is supplied; determining whether the synchronized frequency is included in the frequency band used for the normal service operation if the received frequency is at least once synchronized with the spaced frequencies; and selecting the frequency band used for the normal service operation as the operational frequency band if the synchronized frequency is included in the frequency band used for the normal service operation.

Preferably, the method according to the present invention further comprises the step of, if the received frequency is not synchronized with any of the spaced frequencies, comparing whether the received frequency is synchronized with spaced frequencies set in frequency bands except for the frequency band used for the normal service operation among the frequency bands stored in the storage section.

Additionally, the method according to the present invention further comprises the steps of, selecting the frequency band allocated to the personal communication system (PCS) as the operational frequency band, if the synchronized frequency is not included in the frequency band used for the normal service operation.

According to the present invention, the operational frequency band of the wireless communication device is selected by comparing a frequency received through a channel with an allocated frequency band and determining whether the received frequency is synchronized with the allocated frequency band and whether the received frequency is included in the allocated frequency band. Thus, the operational frequency band for the normal service can adaptively be selected in accordance with a wireless channel state of the frequency of the service being provided. Also, the operational frequency can more easily be selected when the device moves to a location where a different frequency band is allocated, and the delay of time required for entering into the normal service due to the synchronous errors frequently produced in appliances to which the operational frequency band selection of a dual band is applied can be shortened. Also, the adaptive selection of the operational frequency in accordance with the frequency of the received channel is automatically performed by storing a selectable frequency band and corresponding variable values N. Thus, inconvenience caused by the selection of the frequency band using a provided manual can be removed.

BRIEF DESCRIPTION OF THE DRAWINGS

The above and other objects, features, and advantages of the present invention will be more apparent from the following detailed description taken in conjunction with the accompanying drawings, in which:

FIG. 2 is a diagram illustrating an example of setting of frequency bands stored in a storage section illustrated in FIG. 1 and variable values corresponding to the set frequency bands;

DETAILED DESCRIPTION OF THE PREFERRED EMBODIMENT

A wireless communication device and a method for selecting an operational frequency band using the wireless communication device according to preferred embodiments of the present invention will be described herein below with reference to the accompanying drawings. In the following description of the present invention, a detailed description of known functions and configurations incorporated herein will be omitted when it may make the subject matter of the present invention rather unclear.

Figure 1:
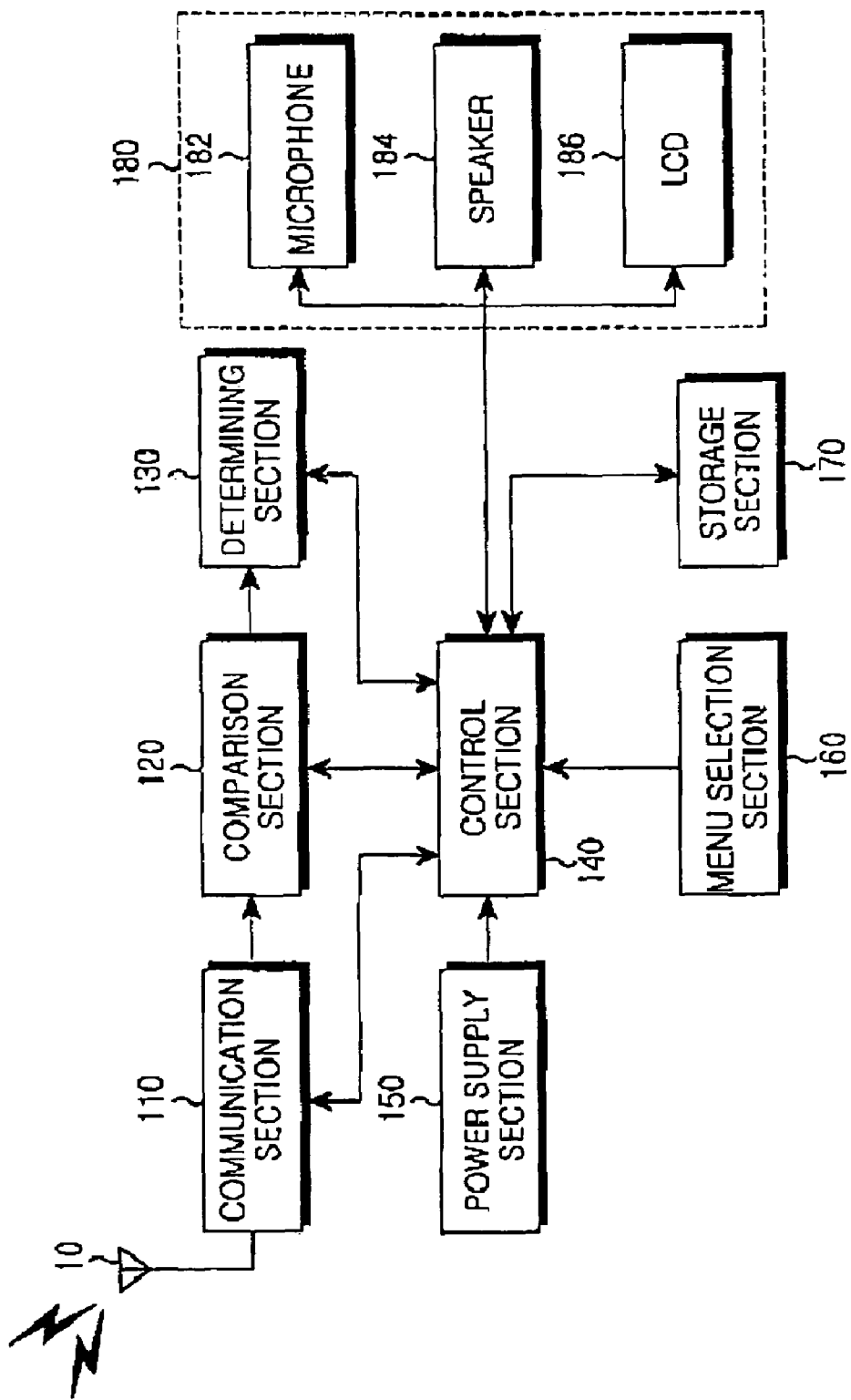
FIG. 1 is a block diagram of a wireless communication device according to a preferred embodiment of the present invention.

FIG. 1 is a block diagram of a wireless communication device according to a preferred embodiment of the present invention. In the embodiment of the present invention, explanation will be made centering around generally used frequency bands among allocated frequency bands, and thus the GSM frequency band, DCS frequency band, and frequency band where GSM and PCS are combined together will not be considered. Accordingly, in the embodiment of the present invention, explanation will be made in consideration of the United States type PCS frequency band and the European type frequency band where GSM and DCS are combined together.

As illustrated in FIG. 1, the wireless communication device according to the embodiment of the present invention includes a communication section 110, comparison section 120, determining section 130, control section 140, power supply section 150, menu selection section 160, storage section 170, and input/output (I/O) section 180.

The communication section 110 is connected to an antenna 10, and performs a mutual communication with an external communication device using set frequency bands. The comparison section 120 determines whether a frequency received through antenna 120 is consistent with spaced frequencies in the frequency band set by control section 140. If at least one received frequency is consistent with the spaced frequencies as a result of comparison, the determining section 130 determines whether the consistent frequency is included in the set frequency band. The control section 140 selects the set frequency band as the operational frequency band of the wireless communication device if the received frequency is included in the set frequency band.

The power supply section 150 supplies the power required for the operation of the wireless communication device in accordance with the corresponding menu selection of menu selection section 160. The menu selection section 160 is provided with keys for selecting and operating functions set in the wireless communication device, and transmits selected key signals to control section 140. The storage section 170 stores driving programs and software required to operate the wireless communication device. The I/O section 180 inputs and outputs corresponding data in accordance with the functions preset in the wireless communication device and commands selected by manipulation of menu selection section 160.

The I/O section 180 has a microphone 182, speaker 184, and LCD 186. The microphone 182 receives an external sound signal and transmits it to the control section 140. The speaker 184 amplifies and outputs the analog sound output from control section 140. The LCD 186 displays text and image data output from control section 140.

The storage section 170 stores allocated frequency bands of GSM, DCS, and PCS and combined frequency bands, and sets and stores variable values N corresponding to the respective frequency bands.

FIG. 2 is a diagram illustrating an example of setting of frequency bands stored in storage section 170 illustrated in FIG. 1 and variable values N corresponding to the set frequency bands. As illustrated in FIG. 2, the variable values N set corresponding to the frequency bands use 4 bits. Among them, one bit is used for classifying a single band indicating the respective frequency band and a multi-band that indicates a frequency band where a plurality of frequency bands are combined. The remaining 3 bits are used for classifying the respective frequency bands of the single band and the multi-band.

In FIG. 2, the frequency bands used according to the embodiment of the present invention are PCS, GSM, combined band of GSM and DCS, and a whole band. Thus, the corresponding variable values N are 4, 7, and 11.

The storage section 170 stores the frequency bands used when the wireless communication device performs a normal service operation and the corresponding variable values N. Thus, if a command for performing the normal service operation is input in a state that the power is initially supplied from the power supply section 150 and/or in a no-service state, the control section 140 selects the frequency band corresponding to the variable value N stored in storage section 170 as an initial operational frequency band.

The comparison section 120 determines whether the received frequency is synchronized with spaced frequencies set in the initial operational frequency band selected by control section 140. If the received frequency is synchronized at least once with the spaced frequencies, the determining section 130 determines whether the synchronized frequency is included in the initial operational frequency band selected by control section 140. If the synchronized frequency is included in the frequency band, the control section 140 selects the initial operational frequency band as the operational frequency band of the wireless communication device.

If the determining section 130 determines that the synchronized frequency is not included in the initial operational frequency band, the control section 140 determines whether the synchronized frequency is in an overlapping band where the allocated bands of PCS and DCS overlap. If the synchronized frequency is in the overlapping band, the control section 140 selects the whole band, including the allocated bands of PCS and DCS as the operational frequency band of the wireless communication device. Also, if the synchronized frequency is not in the overlapping band, the control section 140 selects one of the frequency bands, other than the initial operational frequency band, as the operational frequency of the wireless communication device. That is, if the initial operational frequency band is GSM, the control section 140 selects the frequency band of PCS as the operational frequency.

Accordingly, by selecting the operational frequency band of the wireless communication device by comparing the frequency received through the channel with the allocated frequency band and determining whether the received frequency is synchronized with and included in the allocated frequency band, the operational frequency band for the normal service can adaptively be selected in accordance with the wireless channel state of the frequency of the service being provided.

Figure 3:
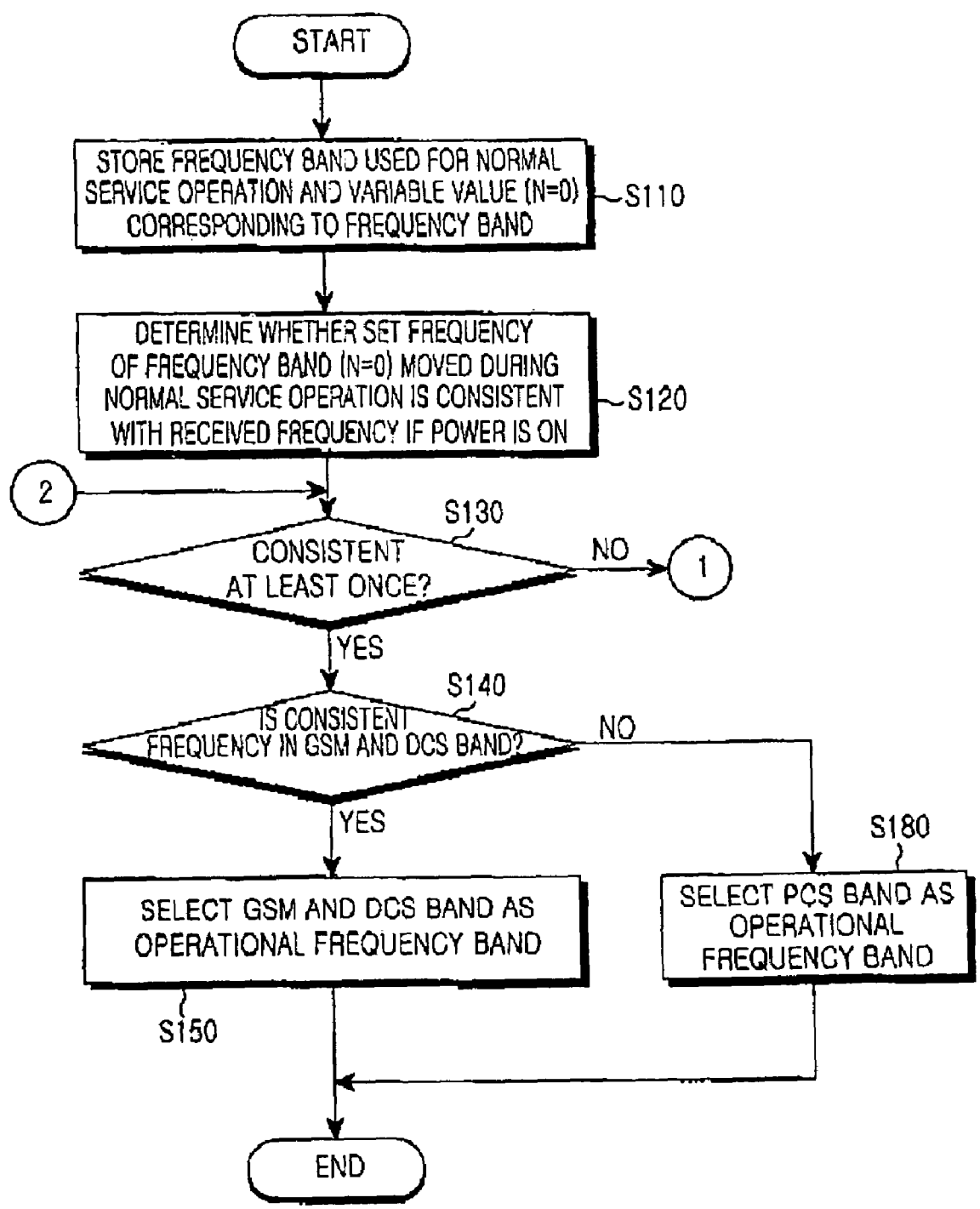
FIG. 3 is a flowchart illustrating a method for selecting an operational frequency band using a wireless communication device according to the present invention.

FIG. 3 is a flowchart illustrating a method for selecting an operational frequency band using a wireless communication device according to the present invention. In step S110, the storage section 170 stores the frequency band used when the wireless communication device performs a normal service operation and the corresponding variable value N. In the embodiment, the frequency band used for the normal service operation is set to the frequency band of GSM. Thus, the variable value N set corresponding to the GSM frequency band is '0'.

If the power of the wireless communication device is turned on in a state that the frequency band used for the normal service operation and the corresponding variable value (N=0) are stored, the comparison section 120 determines whether the received frequency is synchronized with the spaced frequencies set in the frequency band (N=0) that is used for the normal service operation and stored in storage section 170 in step S120.

If the received frequency is synchronized at least once with the spaced frequencies in step S130, the determining section 130 determines whether the synchronized frequency is included in the frequency band of GSM and DCS in step S140. If the synchronized frequency is included in the frequency band of GSM and DCS, the control section 140 selects the frequency band of GSM and DCS as the operational frequency band of the wireless communication device in step S150. However, if the synchronized frequency is not included in the frequency band of GSM and DCS in step S140, the control section 140 selects the PCS frequency band as the operational frequency of the wireless communication device in step S180.

Figure 4:
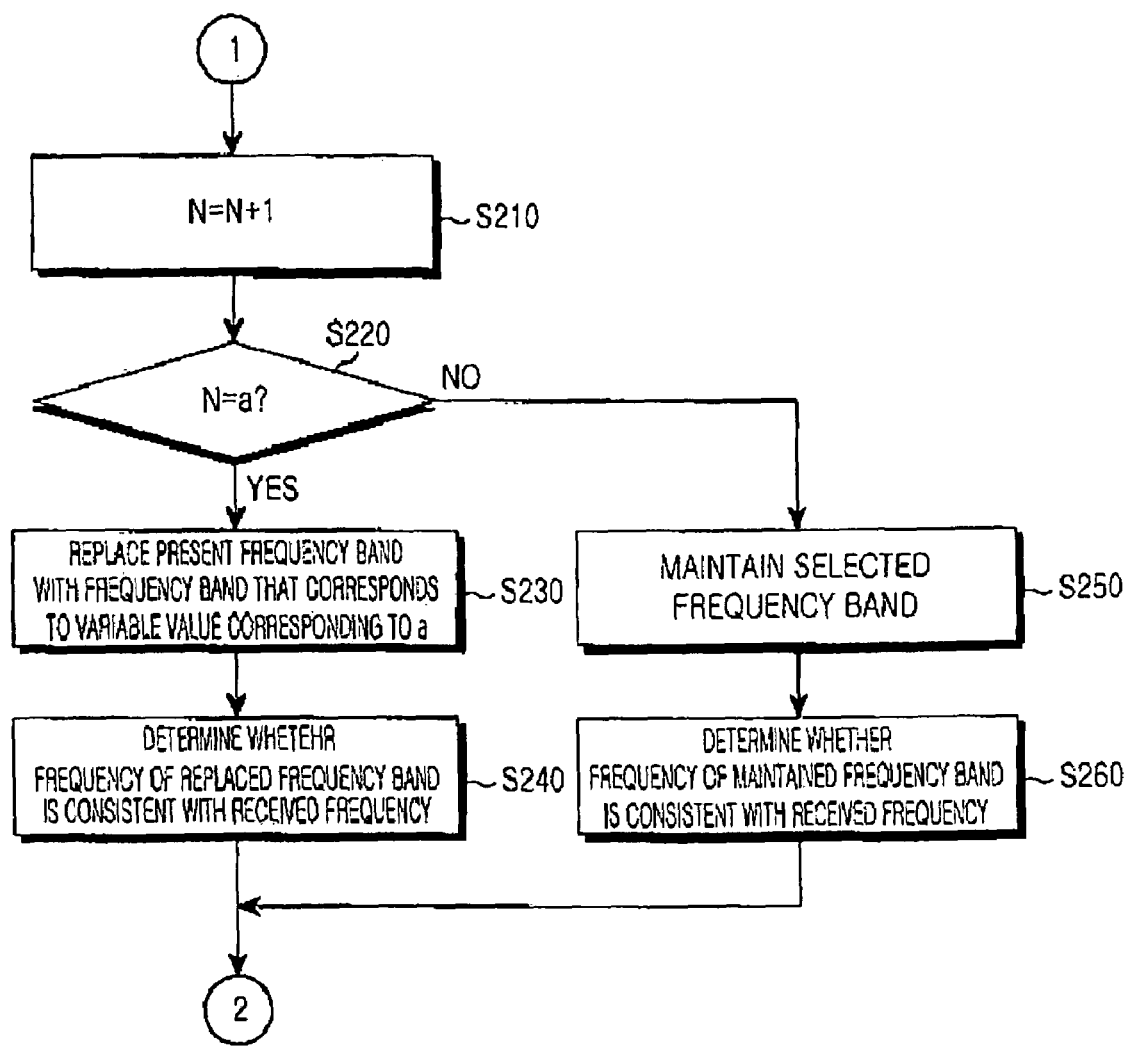
FIG. 4 is a flowchart illustrating a method for selecting an operational frequency band when the frequencies are not synchronized in the comparing step illustrated in FIG. 3.

FIG. 4 is a flowchart illustrating a method for selecting an operational frequency band when the frequencies are not synchronized at all as a result of comparison by the comparison section 120 in step S130. In FIG. 4, the control section 140 adds '1' to the variable value (N=0) in step S210, and thus the variable value N becomes '1'. The control section 140 determines whether the variable value (N=1) corresponds to a certain variable value (N=a) considered in the embodiment of the present invention in step S220. For example, the control section 140 determines whether the variable value N corresponding to the frequency band of PCS is '4'.

If the variable value (N=a) is not '4', the control section 140 continuously maintains the frequency band corresponding to the variable value (N=0) initially selected, and provides the maintained frequency band to the comparison section 120 in step S250. Accordingly, the comparison section 120 determines whether the spaced frequency of the frequency band initially selected is consistent with the received frequency in step S260, and then returns to step S130.

If the variable value N is the certain value a in step S220, the control section 140 draws out the frequency band that corresponds to the variable value N corresponding to the certain value "a" from the storage section 170, and provides the frequency band to the comparison section 120 in step S230. For example, if the certain value "a" is '4', the control section 140 draws out the frequency band of PCS from the storage section 170, and provides the frequency band to comparison section 120. If the certain value "a" is '7', the control section 140 draws out the frequency band of GSM and DCS from the storage section 170, and provides the frequency band to comparison section 120. If the certain value "a" is '11', the control section 140 draws out a whole frequency band, including the frequency bands of PCS, GSM, and DCS from the storage section 170, and provides the frequency band to comparison section 120. The comparison section 120 determines whether the spaced frequency of the frequency band corresponding to the certain value a is consistent with the received frequency in step S240, and the returns to step S130.

Accordingly, the operational frequency is more easily selected when the device moves to a location where a different frequency band is allocated, and a delay of time required for entering into a normal service due to synchronous errors frequently produced in devices to which the operational frequency band selection of a dual band is applied, is shortened.

Also, the adaptive selection of the operational frequency in accordance with the frequency of the received channel is automatically performed by storing selectable frequency band and corresponding variable values N. Thus, inconvenience caused by the selection of the frequency band using a provided manual is removed.

As described above, according to the present invention, the operational frequency band of the wireless communication device is selected by comparing a frequency received through a channel with an allocated frequency band and determining whether the received frequency is synchronized with the allocated frequency band and whether the received frequency is included in the allocated frequency band. Thus, the operational frequency band for the normal service can adaptively be selected in accordance with the wireless channel state of the frequency of the service being provided.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wireless communication device for performing wireless communication through set operational frequency bands, the wireless communication device comprising:
   a storage section for storing the set frequency bands, variable values for the respective frequency bands, and a first frequency band used for a normal service operation;
   a power supply section for supplying a power for performing the normal service operation in accordance with an input command;
   a comparison section for determining whether a received frequency is synchronized with spaced frequencies set in the first frequency band, if the power is supplied; and
   a control section for, as a result of such determining in the comparison section, if it is determined that the received frequency is not synchronized with any of the spaced frequencies, comparing whether the received frequency is synchronized with spaced frequencies set in second frequency bands other than the first frequency band used for the normal service operation among the received frequency and the frequency bands stored in the storage section, and if the synchronized frequency is included in the second frequency band, selecting an operational frequency band as the second frequency band.

2. The wireless communication device as claimed in claim 1, wherein the control section, if the synchronized frequency in the second band is an overlapping band of different kinds of frequency bands used in different areas, selects a whole band as the operational frequency band.

3. The wireless communication device as claimed in claim 1, wherein the frequency bands stored in the storage section include at least one of a frequency band allocated to a personal communication system (PCS) and a frequency band including a global system for mobile communication (GSM) and a digital cellular system (DCS).

4. The wireless communication device as claimed in claim 1, wherein the variable values corresponding to the frequency bands are each composed of 4 bits.

5. The wireless communication device as claimed in claim 1, further comprising a determining section for, as a result of such determining in the comparison section, determining whether the synchronized frequency is included in the first frequency band used for the normal service operation, if the received frequency is synchronized with the spaced frequencies at least once.

6. The wireless communication device as claimed in claim 5, wherein as a result of such determining in the comparison section, the control section selects the first frequency band as the operational frequency band, if the synchronized frequency is included in the first frequency band.

7. A method for selecting an operational frequency band using a wireless communication device, the method comprising the steps of:
   (a) storing frequency bands set for performing wireless communication, variable values for the respective frequency bands, and a frequency band used for a normal service operation;
   (b) supplying a power for performing the normal service operation in accordance with an input command;

(c) determining whether a received frequency is synchronized with spaced frequencies set in the frequency band used for the normal service operation and stored in the storage section, if the power is supplied;

(d) if it is determined that the received frequency is not synchronized with any of the spaced frequencies, comparing whether the received frequency is synchronized with spaced frequencies set in second frequency bands other than the first frequency band among the received frequency and the frequency bands stored in the storage section; and (e) if the synchronized frequency is included in the second frequency band, selecting an operational frequency band as the second frequency band.

8. The method as claimed in claim 7, wherein the frequency bands stored in the storage section include at least one of a frequency band allocated to a personal communication system (PCS) and a frequency band including a global system for mobile communication (GSM) and a digital cellular system (DCS).

9. The method as claimed in claim 7, wherein in step (c), if the synchronized frequency in the second frequency band is an overlapping band of different kinds of frequency bands used in different areas, a whole band is selected as the second frequency band.

10. The method as claimed in claim 7, wherein the variable values corresponding to the frequency bands stored in the storage section are each composed of 4 bits.

11. The method as claimed in claim 6, wherein in step (c), it is determined whether the synchronized frequency is included in the first frequency band, if the received frequency is synchronized at least once with the spaced frequencies, and the first frequency band used for the normal service operation is selected as the operational frequency band, if the synchronized frequency is included in the first frequency band.

* * * * *